(No Model.) 3 Sheets—Sheet 3.

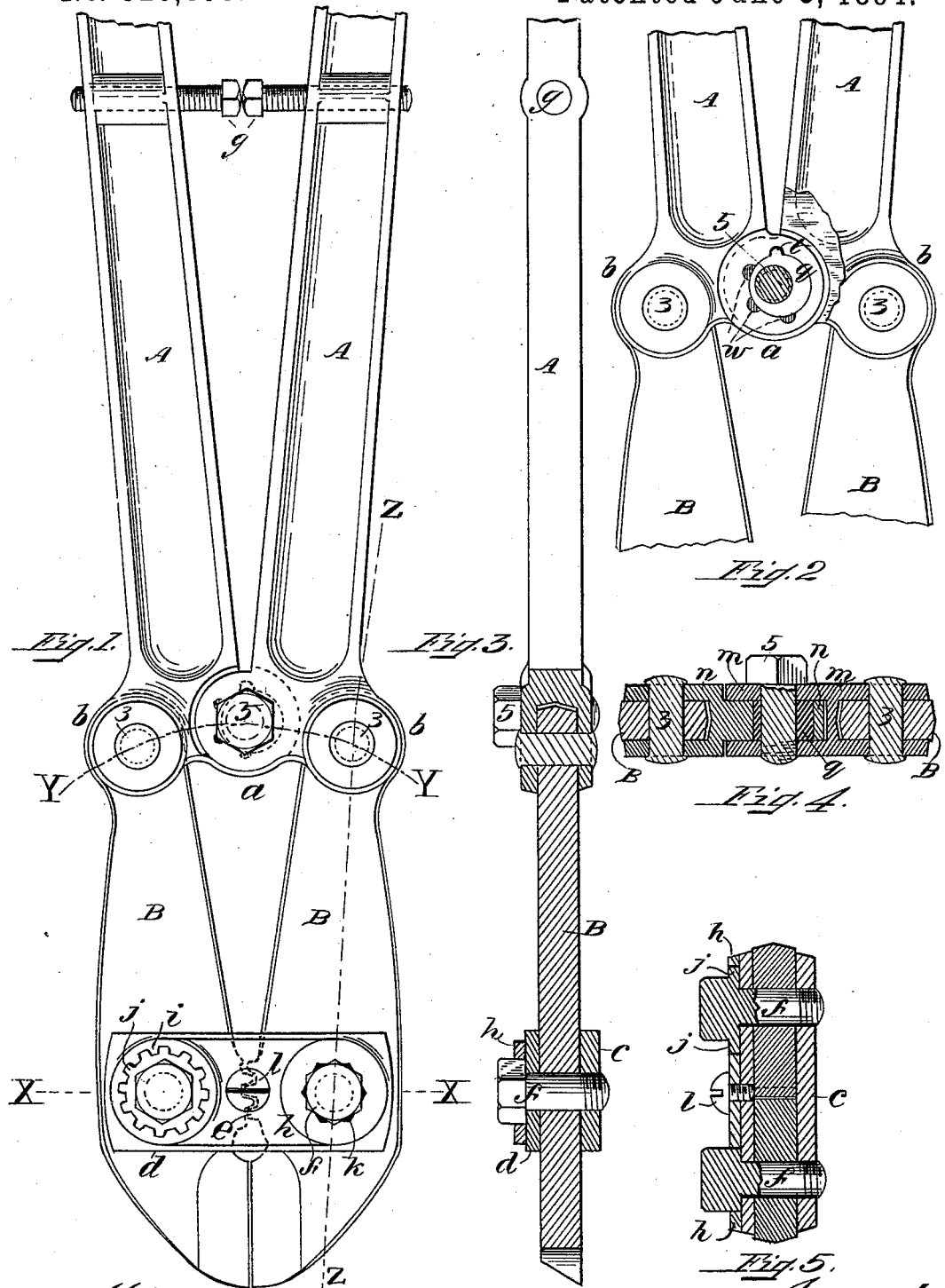

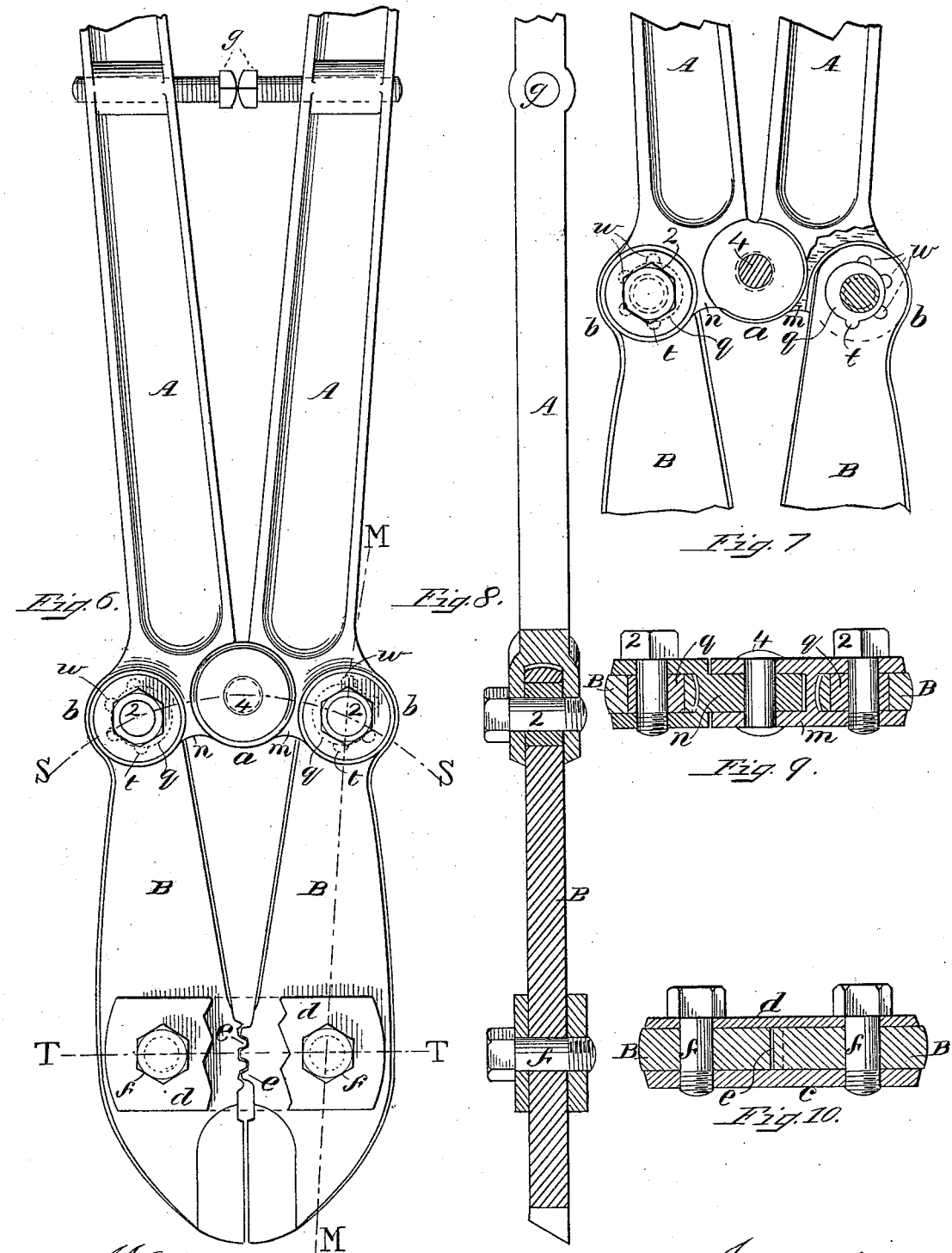

H. K. PORTER.
BOLT CLIPPERS.

No. 520,896. Patented June 5, 1894.

Witnesses: James D. Thomson, J. Audley Maxwell

Inventor: Henry K. Porter, per T. W. Porter Atty

UNITED STATES PATENT OFFICE.

HENRY K. PORTER, OF BOSTON, MASSACHUSETTS.

BOLT-CLIPPERS.

SPECIFICATION forming part of Letters Patent No. 520,896, dated June 5, 1894.

Application filed January 25, 1894. Serial No. 498,028. (No model.)

*To all whom it may concern:*

Be it known that I, HENRY K. PORTER, of Boston, in the county of Suffolk and State of Massachusetts, have invented a new and useful Improvement in Bolt-Clippers, which will, in connection with the accompanying drawings, be hereinafter fully described, and specifically defined in the appended claims.

Figure 11:
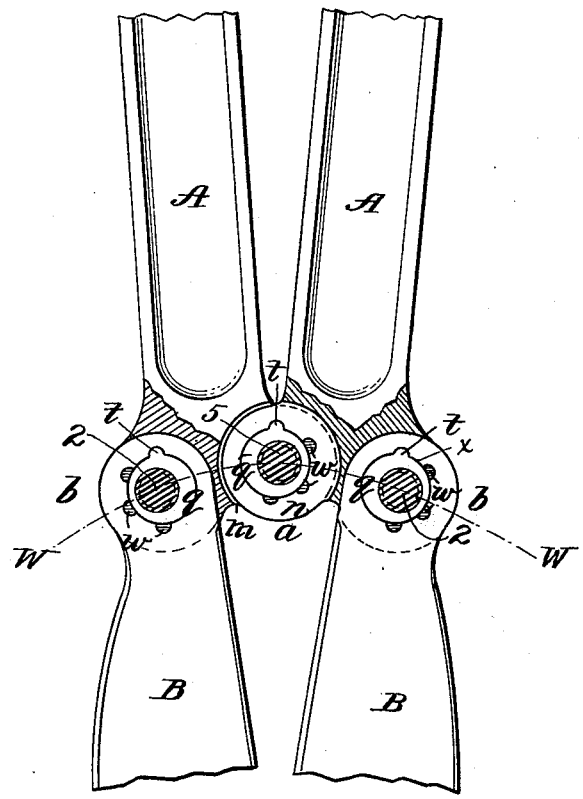
Figure 12:
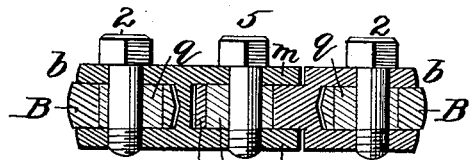

In said drawings: Figure 1 is a top plan view of a cutter embodying in part my invention. Fig. 2, is a detached plan view showing the connection of the handles and jaws, parts being broken away. Fig. 3, is a sectional edge view of Fig. 1; the section being taken on line Z, Fig. 1. Fig. 4, is a transverse section taken on line Y, Fig. 1. Fig. 5, is a transverse section taken on line X, Fig. 1. Fig. 6, is also a top plan view of a cutter embodying in part my invention. Fig. 7, is a detached central portion of Fig. 6, parts being broken away. Fig. 8, is a side sectional view of Fig. 6, the section being taken on line M. Fig. 9, is a transverse section taken on line S, Fig. 6. Fig. 10, is a transverse section taken on line T, Fig. 6. Fig. 11 shows, as in Figs. 2 and 7, the central portion of handles A and jaws B; the pivot bolts and a portion of the handles being in section the better to show interior parts. Fig. 12 is a vertical section taken through Fig. 11, on line W, W, and showing, as in Fig. 11, the parts A and B having each an eccentric $q$ in the pivot joints, $a$ and $b, b$.

This invention relates to cutters designed for cutting bolts, rivets, wire and similar articles, and it consists of various devices and the combinations thereof, as will be next herein explained and then stated in the claims.

Referring again to said drawings, A, A, represent the handles or levers, as they are termed, and B the cutting jaws. Said levers are pivoted together at $a$ and the jaws are pivoted to the levers at $b, b;$ the jaws entering between the two ears of the handles as shown in Figs. 4, 5, 9 and 10; and one of the handles being formed to enter between two ears of the other as shown in said figures.

The cutting jaws B are connected together by the straps $c$ and $d$, and the bolts $f$ that pass through strap $d$ and jaws B and are threaded in strap $c$ as shown. Said jaws B are held in correct alignment with handles A by the interlocking teeth $e$ formed on the jaws for that purpose.

Bolts $f$ may be locked in position by a locking plate $h$ that may be formed with teeth $i$ that interlock in teeth $j$ that may be formed on the head of bolt $f$ as shown in Fig. 1 at the left, as also in Figs. 3 and 5, or said plate may be formed with a twelve sided hole having angles $k$ at the intersection of the lines of said hole, so that by turning the hexagon headed bolt one twelfth of a circle or turn it can be locked by said plate, as is fully shown at the right hand of Fig. 1. Said plate $h$ may be secured in place upon plate $d$ by a screw $l$ as shown.

The levers A are formed at $a$ with the ears $m, m$ upon one lever and the ears $n$ formed upon the other lever, so that part $n$ fits between parts $m, m;$ and a passage of proper size for bolt 5 is formed through said ears $m$ while ear $n$ is formed with a larger passage for reception of eccentric $q$ through which is a passage for bolt 5, which passage is arranged eccentric to the outside of $q$ as shown. Upon the periphery of eccentric $q$ is formed a longitudinal rib $t$ which will fit into slots or recesses $w$ formed in ear $n$, so that when jaws B are new said eccentric is arranged as shown in Fig. 2, so as to bring the rear ends of joints $b, b$ near together; and when said jaws are partly worn eccentric $q$ will be removed and so replaced that its rib $t$ will be in the next recess $w;$ and as jaws B continue to be worn away said eccentric will be so readjusted in the respective recesses $w$ in ear $n$. When it is desired to employ this adjusting device in connection with the rear ends of jaws B, then the rear hole $x$ in said jaws will be formed of a size to receive eccentric $q$ and it will also be formed with recesses $w$ in which rib $t$ will enter, and the eccentrics will be first arranged to hold the rear end of jaws B near together as shown in Figs. 6 and 7, and as the cutting edges are worn away said eccentrics will be changed in recesses $w$ to bring said edges together as when new. When central joint $a$ alone is provided with an eccentric, joints $b$ may be secured with rivets 3 as shown in Figs. 1 and 4; while if joints *b* are alone provided with such eccentrics then joint *a* can be secured by rivet 4 as shown in Figs. 6 and 9; but when eccentrics *q* are employed in both joints *a* and *b* then bolts 2 and 5 will both be used. For the purpose of adjusting the coming together of the rear ends of handles A the buffer studs *g* may be threaded in said levers; and by suitably adjusting said buffers the proper coming together of the cutting edges of jaws B can to a limited extent be regulated.

Having thus described my invention, what I claim as new, and desire to secure by Letters Patent, is—

1. In a bolt clipper, the combination with levers A, of the interior ear *n* formed upon one of said levers and with an eccentric passage therethrough with a series of recesses *w* formed at the side of said passage and extending beyond the line of the same, the eccentric *q* formed with a hole therethrough near one side for reception of bolt 5; said eccentric being also formed with a rib *t* upon its outer periphery, that engages in said recesses *w* as said eccentric may be adjusted to either of said seats, for the purposes specified.

2. In a bolt clipper, the combination of handles A, the jaws B formed with a hole larger than the co-acting hole in A, and with side recesses *w* formed therein; the eccentrics *q* formed with a longitudinal rib *t* to fit in either of said recesses *w*, and with a hole for bolt 2, eccentric to the periphery of *q* and of a size corresponding to that in handles A, for the purposes specified.

3. In a bolt clipper the combination of handles A, the jaws B, an eccentric *q* having a longitudinal rib *t* formed thereon and arranged in ear *n* of a handle A formed to receive said eccentric, with side recesses *w* for reception of said rib, and the rear ends of jaws B formed with a hole for reception of an eccentric *q*, with side recesses *w*, and said eccentric *q* formed to fit the hole in the rear end of said jaws and having a longitudinal rib *t* formed upon it and adapted to enter either of the recesses *w* in said hole for the purposes specified.

4. In a bolt clipper the combination of jaws B formed with interlocking teeth *e* the straps *c*, *d*, and bolts *f* passing through the same and through said jaws, the levers A, pivoted together and to said jaws, and formed with interior ear *n* with an enlarged passage for reception of eccentric *q* and with side recesses *w* therein, and the said eccentric *q* formed with a longitudinal rib *t* arranged to fit in either of recesses *w*, for the purpose stated.

5. In a bolt clipper, the combination of jaws B the straps *c*, *d* with bolts *f* passing through the same and said jaws, the handles A pivoted together and to said jaws, and said jaws B formed with an enlarged hole at the rear end, with side recesses *w* in said holes and an eccentric *q* formed with a longitudinal rib *t* to fit in either of said recesses, for the purpose specified.

6. In a bolt clipper, the combination of jaws B, straps *c*, *d*, and bolts *f*, passing through said straps and jaws to hold them in position; the handles A hinged together and to said jaws, the central interior ear *n* formed upon one of said handles and with a passage therethrough, with side recesses *w* extending outside the boundary of said passage, to receive eccentric *q*; and the jaws B formed with an enlarged hole *x* in their rear ends to receive an eccentric *q* and with side recesses *w* at the sides of said holes, and the eccentric *q* formed with a longitudinal rib *t*, adapted to fit in either of said recesses *w* when so inserted, for the purposes specified.

7. In a bolt clipper, the combination of jaws B, the straps *c* and *d*, the bolts *f* passing through said straps and jaws to hold them in position, the locking plate *h* interlocked with said bolts to hold the same from rotation, the handles A hinged together and pivoted to said jaws B, and the interior central ear *n* formed with an enlarged passage therethrough for eccentric *q*, and with side recesses *w* extending outside the boundary of said passage, and said eccentric *q* formed with an external longitudinal rib *t* to fit in either of said recesses for the purposes specified.

8. In a bolt clipper, the combination of jaws B, the straps *c*, *d*, the bolts *f* passing through said straps and jaws to hold said parts in position, the locking plate *h* arranged to lock said bolts and prevent their rotation, the handles A pivoted together and to said jaws, the central interior ear *n* formed upon one of said handles and with an enlarged hole therethrough for eccentric *q*, with side recesses *w* extending outside its boundary; the rear ends of said jaws also formed with enlarged holes to receive eccentric *q* and with side recesses *w* extending beyond the boundary of said holes, and eccentric *q* having a longitudinal rib *t* formed thereon to fit in either of the recesses *w* in said ear *n* and jaws B, for the purposes specified.

9. In a bolt clipper, the combination of adjustable buffers *g*, the straps *c*, *d*, jaws B and bolts *f* passing through said straps and jaws and holding them in position; the handles A pivoted together and to said jaws, and the said jaws B; the central interior ear *n* formed upon one of said handles, and with an enlarged hole therethrough to receive eccentric *q*, and with side passages *w* formed therein and extending beyond the boundary of said hole, and the eccentric *q* having a longitudinal rib *t* formed upon it to fit in either of said recesses, for the purposes specified.

10. In a bolt clipper, the combination of adjustable buffers *g*, the handles A pivoted together and to jaws B, the said jaws and the straps *c*, *d* and bolts *f* by which said parts are held in position; the interior central ear *n* formed with an enlarged hole therethrough for eccentric $q$ with side recesses $w$ extending beyond the boundary of said hole, and said eccentric formed with a longitudinal rib $t$ adapted to fit in either of said recesses, and said jaws formed at their rear ends with enlarged holes with side recesses $w$ to receive said eccentric $q$ having said rib $t$ formed thereon, to fit in either of said recesses $w$, for the purposes specified.

HENRY K. PORTER.

Witnesses:
L. W. HOWES,
T. W. PORTER.